No. 825,461. PATENTED JULY 10, 1906.
G. A. HASSELER.
COMBINATION IMPLEMENT.
APPLICATION FILED APR. 8, 1905. RENEWED MAY 5, 1906.

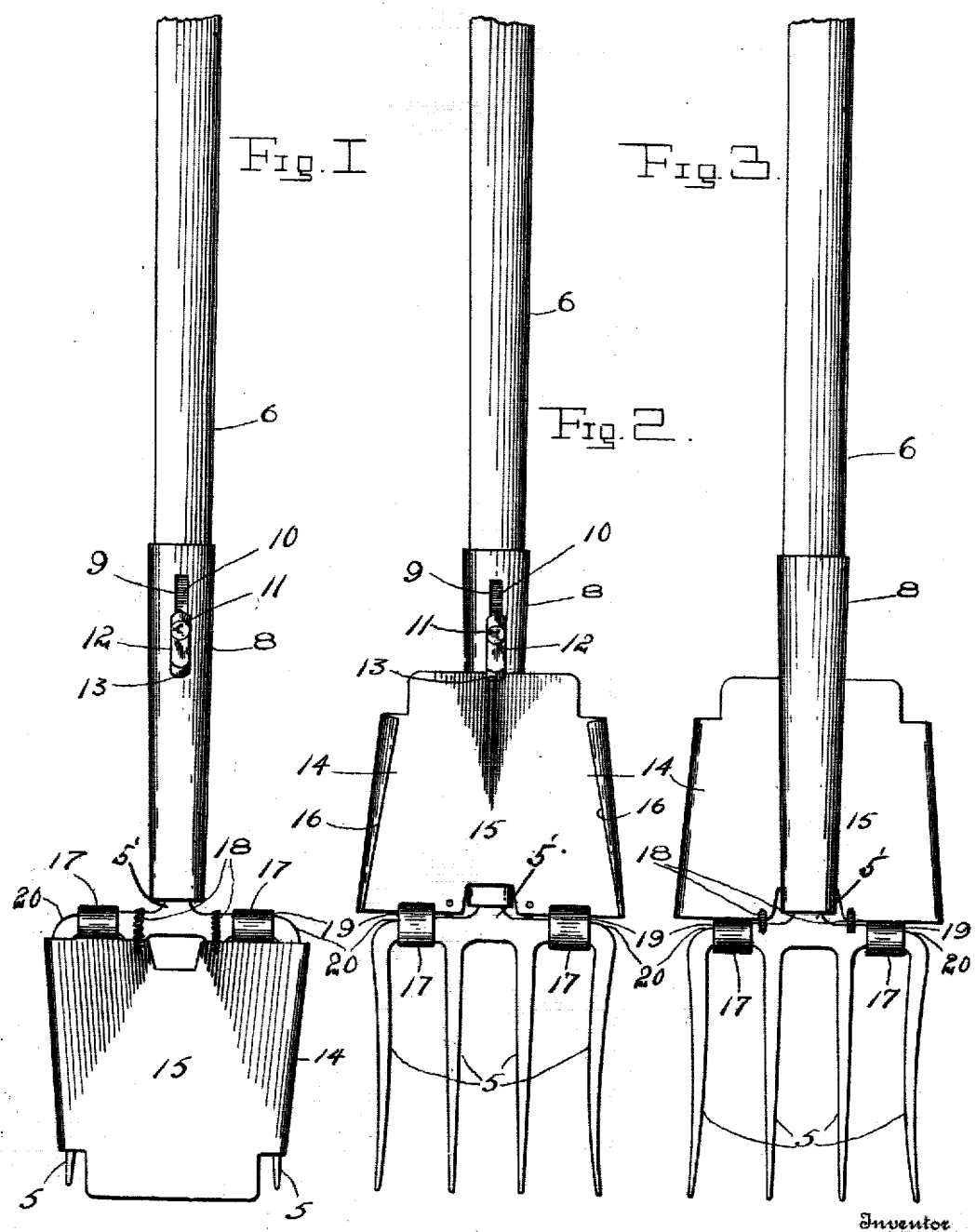

2 SHEETS—SHEET 2.

Witnesses
J. C. Simpson
E. M. Oxford

Inventor
Gustave A. Hasseler
By Chandler & Chandler
Attorneys

UNITED STATES PATENT OFFICE.

GUSTAVE A. HASSELER, OF VESPER, WISCONSIN.

COMBINATION IMPLEMENT.

No. 825,461.

Specification of Letters Patent.

Patented July 10, 1906.

Application filed April 8, 1905. Renewed May 5, 1906. Serial No. 315,376.

*To all whom it may concern:*

Be it known that I, GUSTAVE A. HASSELER, a citizen of the United States, residing at Vesper, in the county of Wood, State of Wisconsin, have invented certain new and useful Improvements in Combination Implements; and I do hereby declare the following to be a full, clear, and exact description of the invention, such as will enable others skilled in the art to which it appertains to make and use the same.

This invention relates to combination implements, and more particularly to combination farm implements, and has for its object to provide an implement which will embody both a fork and a shovel and which will be so arranged that it may be changed from one to the other quickly and with little or no difficulty.

Another object is to provide an implement of this nature which will be simple and which may be manufactured at a low figure.

Other objects and advantages will be apparent from the following specification, and it will be understood that changes in the specific construction shown and described may be made and that any suitable materials may be used without departing from the spirit of the invention.

Figure 4:
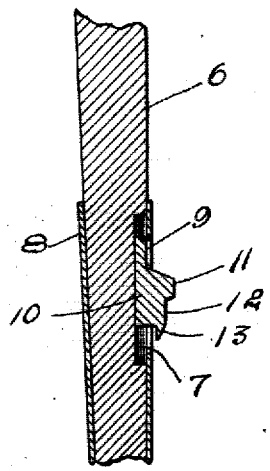
Figure 5:
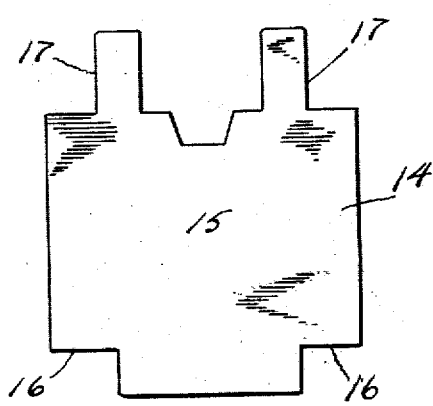
Figure 6:
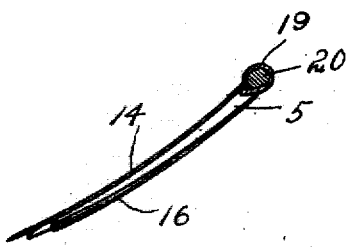

In the drawings forming a portion of this specification, and in which like numerals of reference indicate similar parts in the several views, Figure 1 is an elevation of the present invention used as a shovel. Fig. 2 is a view similar to Fig. 1, showing the device arranged for use as a fork. Fig. 3 is a rear elevation of Fig. 2. Fig. 4 is a longitudinal section of the handle, showing the arrangement of the retainer. Fig. 5 is a view of the blank from which the blade of the shovel is formed. Fig. 6 is a section through the shoulder-receiving loops.

Referring now to the drawings, there is shown a fork of the usual type comprising tines 5, which are carried by a handle 6, the latter having a longitudinally-extending recess 7 therein adjacent to its lower end. A metallic sleeve 8 surrounds the handle at its slotted portion and acts to hold the stem 5' of the tines engaged in the handle, and this sleeve 8 has a slot 9 therein which registers with the recess 7, the slot being somewhat narrower than the recess, so that the portions of the sleeve at the sides of the slot project over the recess. A block 10 is slidably disposed in the recess 7 and has a stem 11 projecting upwardly through the slot 9, and this stem carries a downwardly-extending head 12 at its free end, the downwardly-extending portion of the head forming a jaw 13 for a purpose to be presently described.

A shovel-blade 14 is provided, which is formed from a metallic blank comprising a central portion 15, having laterally-extending wings 16 at its sides and upwardly-extending ears 17 at its top, the latter being spaced and being bent to form spaced loops 19, in which the shoulders 20 of the fork are engaged for pivotal movement of the blade thereupon. The wings 16 are bent to engage over the outermost tines of the fork and when thus engaged hold the blade in operative position, and the device may then be used as a shovel.

When the device is to be used as a fork, the free ends of the outermost tines are sprung together by resting one of said tines upon the other with the ground and pressing upon the other with the foot. This disengages the wings 16 from the tines, and the blade is moved by springs 18, engaged with the shoulders 20 and connected with the blade to cause it to extend upwardly against the handle, the free edge of the blade then lying in position for engagement of the jaw 13 thereover to hold the blade out of operative position. The jaw is held in position for engagement of the blade by means of a spring disposed between the block 10 and the upper end of the recess 7.

What is claimed is—

1. A device of the class described comprising a handle, tines having shoulders and having a stem engaged in one end of the handle, said handle having a recess therein, a metallic sleeve engaged with the handle at the end in which the stem is engaged to hold said stem against disengagement from the handle, said collar inclosing the recessed portion of the handle and having a slot registering with the recess, a block slidably engaged in the recess and extending beneath the collar said block having a stem extending upwardly through the slot, a downwardly-directed jaw carried by the stem, a shovel-blade having loops in which the shoulders of the tines are pivotally engaged for movement of the blade to lie upon the tines or to extend upwardly against the handle, said jaw lying in position for engagement of the blade when in its last-named position, means for holding the block with the jaw yieldably in position to engage the blade, and means for holding the blade upon the tines.

2. The combination with a fork including tines, connecting-shoulders and a handle, of a shovel-blade pivotally connected with the fork for movement into and out of position to lie upon the tines thereof, said shovel-blade having its edge portions bent for engagement with certain of the tines to hold the shovel-blade thereupon.

In testimony whereof I affix my signature in presence of two witnesses.

GUSTAVE A. HASSELER.

Witnesses:
   GEO. P. HAMBRECHT,
   ELEANORE SLATTERY.